(12) United States Patent
Unoson et al.

(10) Patent No.: US 10,159,140 B2
(45) Date of Patent: Dec. 18, 2018

(54) LIGHTING SYSTEM FOR PROVIDING LIGHT IN A ROOM

(71) Applicant: Fagerhults Belysning AB, Habo (SE)

(72) Inventors: Daniel Unoson, Habo (SE); Mats Wernberg, Stockholm (SE)

(73) Assignee: Fagerhults Belysning AB, Habo (SE)

( * ) Notice: Subject to any disclaimer, the term of this patent is extended or adjusted under 35 U.S.C. 154(b) by 0 days.

(21) Appl. No.: 15/129,305

(22) PCT Filed: Mar. 27, 2014

(86) PCT No.: PCT/EP2014/056191
§ 371 (c)(1),
(2) Date: Sep. 26, 2016

(87) PCT Pub. No.: WO2015/144230
PCT Pub. Date: Oct. 1, 2015

(65) Prior Publication Data
US 2017/0127499 A1   May 4, 2017

(51) Int. Cl.
*H05B 33/08* (2006.01)
*H05B 37/02* (2006.01)
*H04W 12/06* (2009.01)
*H04W 4/80* (2018.01)

(52) U.S. Cl.
CPC ........ *H05B 37/0272* (2013.01); *H04W 12/06* (2013.01); *H05B 37/0227* (2013.01); *H04W 4/80* (2018.02); *Y02B 20/44* (2013.01)

(58) Field of Classification Search
CPC ............ H05B 37/0245; H05B 37/0254; H05B 41/3925; H05B 41/391; H05B 41/2828; H05B 33/0803; H05B 37/0272; H05B 33/0857; H05B 33/0227
USPC .......................... 315/153, 151, 154, 224, 307
See application file for complete search history.

(56) References Cited

U.S. PATENT DOCUMENTS

| 9,035,568 B2* | 5/2015 | Ganton | H05B 33/0857 315/216 |
|---|---|---|---|
| 2007/0171091 A1 | 7/2007 | Nisenboim et al. | |
| 2013/0162160 A1* | 6/2013 | Ganton | H05B 37/02 315/210 |

(Continued)

OTHER PUBLICATIONS

International Search Report for International Application No. PCT/EP2014/056191, dated Nov. 19, 2014 (3 pages).

(Continued)

*Primary Examiner* — Douglas W Owens
*Assistant Examiner* — Syed M Kaiser
(74) *Attorney, Agent, or Firm* — Kagan Binder, PLLC

(57) ABSTRACT

The present invention relates to a lighting system (1) for providing light in a room (10) comprising first illuminating means (11), a first control unit (12) configured to control the light emitted from the first illuminating means (11) and further configured to receive wireless control communication (14) from a mobile device (13) after being paired with said mobile device, wherein the lighting system (1) further comprises a sensor (15) for detecting presence in the room (10) and for being communicatively connected (16) to said control unit; and wherein said control unit (12) is configured to only allow pairing of a mobile device (13) to said control unit during a predetermined time following a detection of presence in the room by said sensor (15).

21 Claims, 3 Drawing Sheets

(56) References Cited

U.S. PATENT DOCUMENTS

| | | | |
|---|---|---|---|
| 2015/0044966 A1* | 2/2015 | Shultz | H04B 5/0012 |
| | | | 455/41.1 |
| 2015/0282282 A1* | 10/2015 | Breuer | H05B 37/0272 |
| | | | 315/152 |
| 2016/0027399 A1* | 1/2016 | Wilde | G06F 13/382 |
| | | | 345/520 |
| 2017/0140593 A1* | 5/2017 | Pluss | G07C 9/00309 |

OTHER PUBLICATIONS

Written Opinion for International Application No. PCT/EP2014/056191, dated Nov. 19, 2014 (5 pages).

\* cited by examiner

LIGHTING SYSTEM FOR PROVIDING LIGHT IN A ROOM

CROSS-REFERENCE TO RELATED APPLICATIONS

This application claims priority to and the benefit of International Application No. PCT/EP2014/056191, filed Mar. 27, 2014, and titled "LIGHTING SYSTEM FOR PROVIDING LIGHT IN A ROOM", which is incorporated herein by reference in its entirety.

TECHNICAL FIELD

The present invention relates to a lighting system for providing light in a room being controllable by means of a mobile device.

BACKGROUND OF THE INVENTION

Traditionally, lighting systems for lighting rooms are controlled by electronic switches placed on the wall of the room, requiring the user to be within the reach of the switch to control the light. In more modern solutions the control function may be implemented in a remote control. Some drawbacks with such remote controls are that they are seldom compatible with more than one lighting system, are expensive and easy to misplace.

State of the art lighting systems, allows a user to wirelessly control the light emitted from the lighting system with a mobile device, such as a mobile phone or laptop computer. However, a problem with wireless communication is that it is generally unsecure and may allow unauthorized users to control the lighting system from a distance.

Thus, there is a need for a lighting system for providing light in a room which is wirelessly controllable from a mobile device but which is not available to be remotely controlled by unauthorized users.

SUMMARY OF THE INVENTION

In view of the above-mentioned and other drawbacks of the prior art, the object of the present inventive concept is to provide a lighting systems that at least alleviates above-mentioned problems.

The invention is based on the inventors' realization that by implementing a sensor for detecting presence in the system, and by configuring the control.

The invention is based on the inventors realization that by implementing a sensor for detecting presence in the system, and by configuring the control According to a first aspect of the invention above and other objectives are at least partly achieved by a lighting system for providing light in a room comprising first illuminating means, a first control unit configured to control the light emitted from the first illuminating means and further configured to receive wireless control communication from a mobile device after being paired with said mobile device wherein the lighting system further comprises a sensor for detecting presence in the room and for being communicatively connected to said control unit; and wherein said control unit is configured to only allow pairing of a mobile device to said control unit during a predetermined time following a detection of presence in the room by said sensor.

The wording "lighting system for providing light in a room" in the context of this application shall be understood as a lighting system suitable to provide light inside a room such as an office room, living room, bedroom or any other type of in-house room.

The wording "said control unit is configured to" in the context of this application should be understood as that the control unit does not have to be in communication with the mobile device at all times, but when powered up and a mobile device is paired and in reach of the control unit and the mobile device sends a control signal to the control unit, the control unit should receive such control signal. Thus, a system having a control unit being configured to receive wireless control communication does not at all times have to be in connection with a mobile device. Thus, the control unit shall, when in use, receive wireless control communication from a mobile device after being paired with said mobile device.

The wording "detecting presence" in the context of this application shall be understood as detecting any parameter in the room which could indicate that a person is present in the room, for example by detecting movements, sounds, temperature changes or radiation.

The wording "paired" and "pairing" in the context of this application shall be understood as the process of associating the control unit with a mobile device. The process may and may not include providing a password by means of either the control unit and/or the mobile device. The result of the pairing should be that the mobile device is associated with the control unit and thereby is allowed to send control signals to the control unit. Moreover, the control unit may be able to send information to the mobile device indicating e.g. lighting parameters or power consumption or other relevant information to the user of the mobile device.

The wording "mobile device" in the context of this application shall be understood as any electrical device being mobile and having the capability of wireless communication. This includes, but is not limited to, smart phones, tablets, laptop computers, notebooks or similar.

By providing a lighting system which requires presence in the room to be able to pair a mobile device to the control unit of the system the provided lighting system obtains an increased security. Thereby, it is not possible for an unauthorized user, e.g. passing the room from the outside, to pair the user's mobile device and control the lighting system. Instead, it is required that the user has physical access to the office for being able to control the lighting system by means of the user's mobile device. Thus, a lighting system with increased security which can be controlled from a mobile device is achieved. Moreover, if several lighting systems are arranged within the range of the wireless communication signals of a user's mobile device, the feature of only allowing pairing of the device following a detection of presence in the room limits the number of lighting systems available to the user to choose from, which facilitates the user experience and moreover reduces the risk that an undesired lighting system is chosen. In fact, it helps the user to choose the desired lighting system to be paired with the user's mobile device.

By opening the pairing functionality upon detection of presence only, and by having it active only for a predetermined time following said detection, the security of the system is improved, thus the objective of the invention is achieved. Thereby, the pairing of a mobile device to the control unit is prevented unless a detection of presence has occurred within time span of the predetermined time.

In one embodiment the predetermined time may be between about 5 seconds and about 10 minutes. In another embodiment it may be between about 5 seconds and 2 minutes following the detection.

Thereby, the user's may be able to, either manually or by automatic functionality of the mobile device, pair the mobile device to the lighting system so that it may be used for controlling the light emitted from the lighting system.

In one embodiment of the invention, the sensor may be one of a temperature sensor or a photo sensor. Thereby, a conventional sensor method which is cost effective may be used to detect movements in the room.

In yet one embodiment of the invention, the sensor may be a passive infrared sensor. Thereby, a conventional sensor method which is cost effective may be used to detect presence by e.g. movements in the room.

In some embodiments the sensor may, regardless of which type it is, integrated in a lighting fixture.

The wording light fixture indicates a device provided with illuminating means such as light emitting diode(s), light bulb(s) or equivalent, for providing light. Thereby, the system may be easily installed since no extra wiring, configuration or installation of the sensor itself is needed. Moreover, it ensures that detection of presence is in proximity of the lighting fixture.

In other embodiments the sensor may be arranged at a distance from the lighting fixture. E.g. the sensor may be arranged at the entrance of a room and communicatively connected to the control unit so that the pairing is allowed following a detection of presence as explained above.

In yet one embodiment of the invention, the first illuminating means and control unit may be integrated in a first lighting fixture.

Thereby, the system may be easily installed since no extra wiring, configuration or installation of the control unit itself is needed.

In other embodiments the control unit may be separately arranged from the lighting fixture. E.g. control unit may be placed as a stand-alone unit or together with the sensor if it is arranged separately from the lighting fixture such as at the entrance of a room. In another example, the sensor may be implemented in a second lighting fixture. Thereby, the sensor may be placed at the optimal place for detecting presence, which is not necessarily in proximity of the lighting fixture comprising the control unit.

In yet one embodiment of the invention, the wireless control communication between the mobile device and the control unit may be Bluetooth communication.

Thereby, the wireless communication may be enabled with a standard communication protocol for mobile devices which is supported by a broad range of mobile devices. Further, the reach of the wireless communication may easily be limited to a reasonable distance, limiting the accessibility of the lighting system. Thus, the control unit may be controlled within a desirable distance by means of most mobile devices.

In one embodiment of the invention, the control unit may be configured to control the lighting color of the light emitted from the first illuminating means.

Thereby, the user may control the lighting system such that it illuminates light of a color which is preferred or required at different times or for different activities. E.g. lighting of different colors reflects differently on different colored products. Thereby a user could control how a specific product is perceived in different colored lighting. Moreover, the color of the lighting may be adapted to the activities in the room. E.g. a playing child may appreciate different colored lighting from a working grown up. Moreover, the room may be perceived as being divided into different zones with different colored lighting, wherein each zone may be associated with different activities or feelings. Moreover, colored lighting may be used to compensate for lighting entering the room from other sources, such as sunlight or from other lighting fixtures. Furthermore, it is possible to use the colors to communicate a message, e.g. if the mobile device is a smart phone which receives a phone call while on "silent mode" the color of the light in the room may be changed to e.g. red or green or blue to indicate the call. Similarly, if the mobile device receives an email, a text-message or post a calendar reminder to the user, the color of the light may be changes so as to attract the attention of the user. Furthermore, different colored lighting may be used at different times of the day, e.g. with a warmer light on mornings and evenings than on mid-day.

In yet one embodiment of the invention, the control unit may be configured to control the color temperature of the light emitted from the first illuminating means. The effects and advantages of a lighting system wherein the color temperature can be controlled are largely analogously with the effects and advantages mention above in relation to changing the lighting color. E.g. the user may control the lighting system such that it illuminates light of a color temperature which is preferred or required at different times or for different activities. E.g. lighting of different color temperatures reflects differently on different colored products. Moreover, lighting of different color temperature may be used to compensate for lighting entering the room from other sources, such as sunlight or from other lighting fixtures. Furthermore, different color temperature lighting may be used at different times of the day, e.g. with a warmer light on mornings and evenings than on mid-day.

In yet one embodiment of the invention, the first illuminating means may be arranged in a lighting fixture being a master lighting fixture and said system further comprises at least one slave lighting fixture each comprising illuminating means and a corresponding slave control unit configured to control the light emitted from each of the illuminating means of the at least one slave lighting fixtures and each slave control unit being further configured to receive wireless control communication from the first control unit originating from a mobile device.

Thereby, the mobile device may be used for controlling the lighting system having a plurality of lighting fixtures by directly controlling the master lighting fixture, which controls the slave lighting fixtures such that indirect control of the slave lighting fixtures may be enabled. Thereby, a larger room requiring more than a single lighting fixture may be controlled from the mobile device. Thus, time can be saved and less effort is required by the user compared to if the user were to control each of the lighting fixtures individually.

In one embodiment of the invention, the wireless control communication from the first control unit to the control unit(s) of the at least one slave lighting fixture(s) may be Zigbee communication. Thereby, the wireless control communication may be enabled with a communication protocol proven to be power efficient, allowing many slave lighting fixtures and being secure. Further, the reach of the wireless communication may easily be limited to a reasonable distance, limiting the accessibility of the lighting system. Thus, the master lighting fixture may communicate with a plurality of slave lighting fixtures within the desired range.

According to another aspect of the invention above-mentioned problems with prior art is at least alleviated by use of a lighting system to provide light in a room said system comprising first illuminating means, a first control unit controlling the light emitted from the first illuminating means based on received wireless control communication from a mobile device after being paired with the mobile device, wherein the lighting system further comprises a sensor for detecting presence in the room and being communicatively connected to said control unit, and wherein said control unit only allows pairing of the mobile device to said control unit during a predetermined time following a detection of presence in the room by said sensor.

The effects and advantages of use of a lighting system according to this embodiment are largely analogous with the effects and advantages mention above in relation to the system itself. Specifically, the use of such a lighting system requires presence in the room to be able to pair a mobile device to the control unit which means an increased security. Thereby, it is not possible for an unauthorized user, e.g. passing the room from the outside, to pair the user's mobile device and control the lighting system. Instead, it is required that the user has physical access to the office for being able to control the lighting system by means of the user's mobile device. Thus, a lighting system with increased security which can be controlled from a mobile device is achieved.

In one embodiment of the invention, the sensor may be a passive infrared sensor. Thereby, a conventional sensor method which is cost effective may be used to detect presence by e.g. movements in the room.

In yet one embodiment of the invention, the wireless control communication between the mobile device and the control unit may be Bluetooth communication. Thereby, the wireless communication may be enabled with a standard communication protocol for mobile devices which is supported by a broad range of mobile devices. Further, the reach of the wireless communication may easily be limited to a reasonable distance, limiting the accessibility of the lighting system. Thus, the control unit may be control within a desirable distance by means of most mobile devices.

In yet one embodiment of the invention, the first illuminating means may be arranged in a lighting fixture being a master lighting fixture and said system further comprises at least one slave lighting fixture each comprising illuminating means and a corresponding slave control unit controlling the light emitted from each of the illuminating means of said at least on slave lighting fixture, and each slave control unit further receives wireless control communication from the first control unit controlled by the mobile device.

Thereby, a mobile device may be used for controlling a lighting system having a plurality of lighting fixtures by directly controlling the master lighting fixture, which controls the slave lighting fixtures such that indirect control of the slave lighting fixtures is enabled. Thereby, a larger room requiring more than a single lighting fixture may be controlled from the mobile device. Thus, time can be saved and less effort is required by the user compared to if the user were to control each of the lighting fixtures individually.

In yet one embodiment of the invention, the wireless control communication from the first control unit to the control units of the at least one slave lighting fixtures may be Zigbee communication.

According to another aspect of the invention abovementioned problems with prior art is at least alleviated by use of a lighting system according to any of the embodiments as described above to control the light in a room by means of a mobile device.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
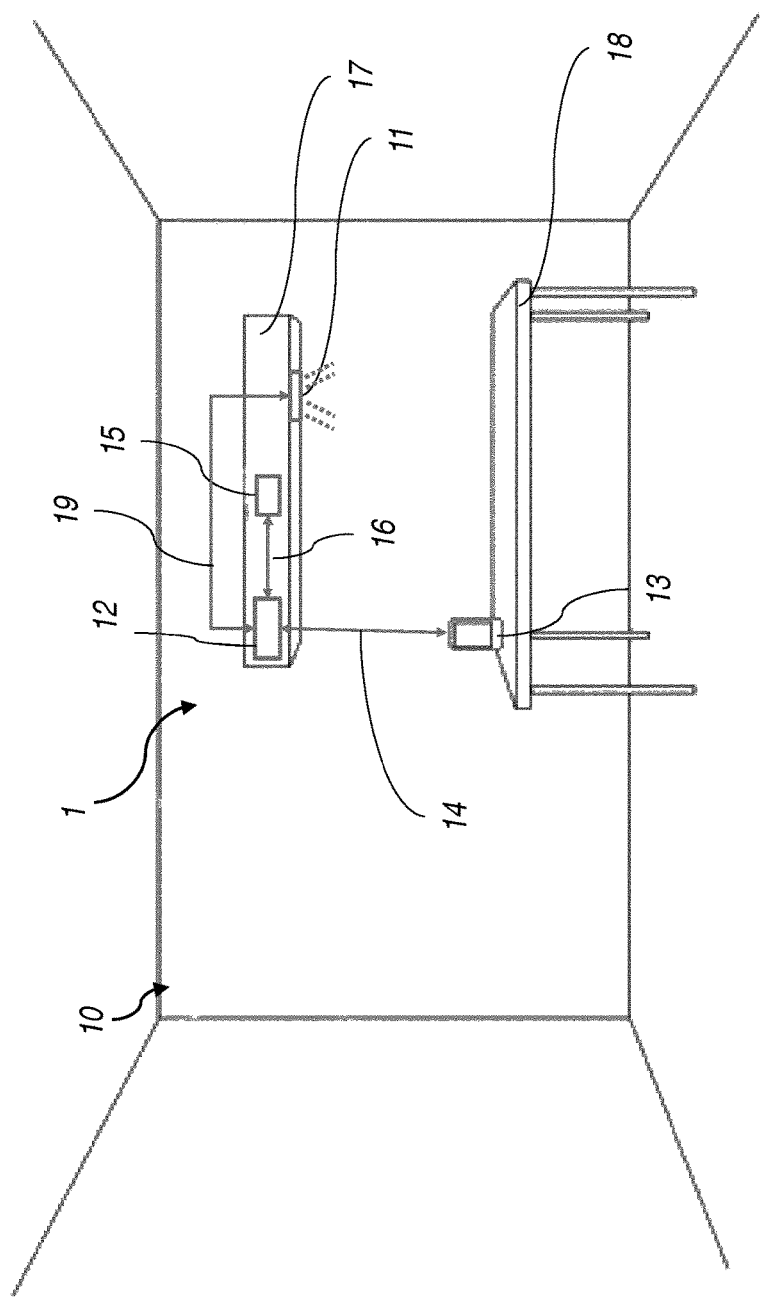
FIG. 1 is a perspective view of a room having a lighting system with a single lighting fixture.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

In the following, the lighting system 1 is arranged inside a room 10 and is described to comprise illuminating means 11 which is arranged inside a lighting fixture 17. Although the first lighting fixture 17 in the illustrated embodiments are all pendant luminaires, the illuminating means may be arranged in any lighting set-up, e.g. a spotlight, desktop luminaire, wall or floor lighting fixture or any other type of luminaire setting.

FIG. 1 illustrates a room 10 having a lighting system 1 for providing light in the room. The room is provided with a desk 18 for indicating that furniture may be placed in the room, e.g. when using the room as an office space. Nevertheless, the room may be any type of room such as an office room, living room, bedroom or any other type of in-house area.

The lighting system comprises a first illuminating means 11, which in this embodiment is arranged inside a first lighting fixture 17. The illuminating means may be of any illuminating kind including emitting diode(s), light bulb(s) or equivalent, for providing light.

Moreover, the system comprises a control unit 12 being in communication with the illuminating means so that it can control the light emitted by the illuminating means. E.g. for controlling on/off, the lighting intensity, color or color temperature or a combination of said control parameters. The communication 19 between said control unit 12 and the illuminating means 11 may be wired or wireless. Moreover, the control unit 12 may be integrated in the lighting fixture 17 as shown in FIG. 1. In other embodiments the control unit 12 may be arranged at a distance from the lighting fixture 17. If the control unit 12 is arranged at a distance from the lighting fixture a wireless communication is preferred, however not required. And correspondingly, if the control unit 12 is arranged inside the lighting fixture 17 a wired communication is preferred, however not required.

The control unit 12 is further configured to receive wireless control communication 14 from a mobile device 13 after being paired with the mobile device. The mobile device 13 is illustrated as a smart phone but may be any electrical device being mobile and having the capability of wireless communication including, but is not limited to, smart phones, tablets, laptop computers, notebooks or similar. When in use, the control unit 12 is in wireless communication with the mobile device 13. The wireless communication 14 between the mobile device and the control unit 12 may be Bluetooth, WLAN, wireless USB, near field communication or any other wireless communication allowing transfer of control signals.

The lighting system 1 as shown in FIG. 1 further comprises a sensor 15 for detecting presence in the room 10 and for being communicatively connected 16 to the control unit. The sensor can be of any type capable of detecting presence in the room. This may be achieved by e.g. detecting sound, light or movements in the room. In a specific example, a PIR (Passive-infrared) sensor is used to detect presence in the room.

Upon detection of presence by means of the sensor 15 the control unit 12 enables paring of a mobile device 13 to the control unit during a predetermined time following the detection. The predetermined time may be chosen to suit the use of the room and/or the user. E.g. some users may prefer preparing something before they want to pair their mobile device to the system whereas other users may want instant pairing of the mobile device to the control unit. As an example, the predetermined time may be e.g. between about 5 seconds and about 10 minutes. In other embodiments it may be between about 5 seconds and 2 minutes following the detection. In one embodiment it is possible to set the predetermined time period from the mobile device, so that the user is able to adjust it to suit his/her needs. Moreover, by choosing a short time following the detection of presence increases the security of the system.

Moreover, if no presence is detected during a predetermined time absence in the room may be verified. Upon verified absence the illuminating means may be shut off, dimmed or changed in other ways.

Figure 2:
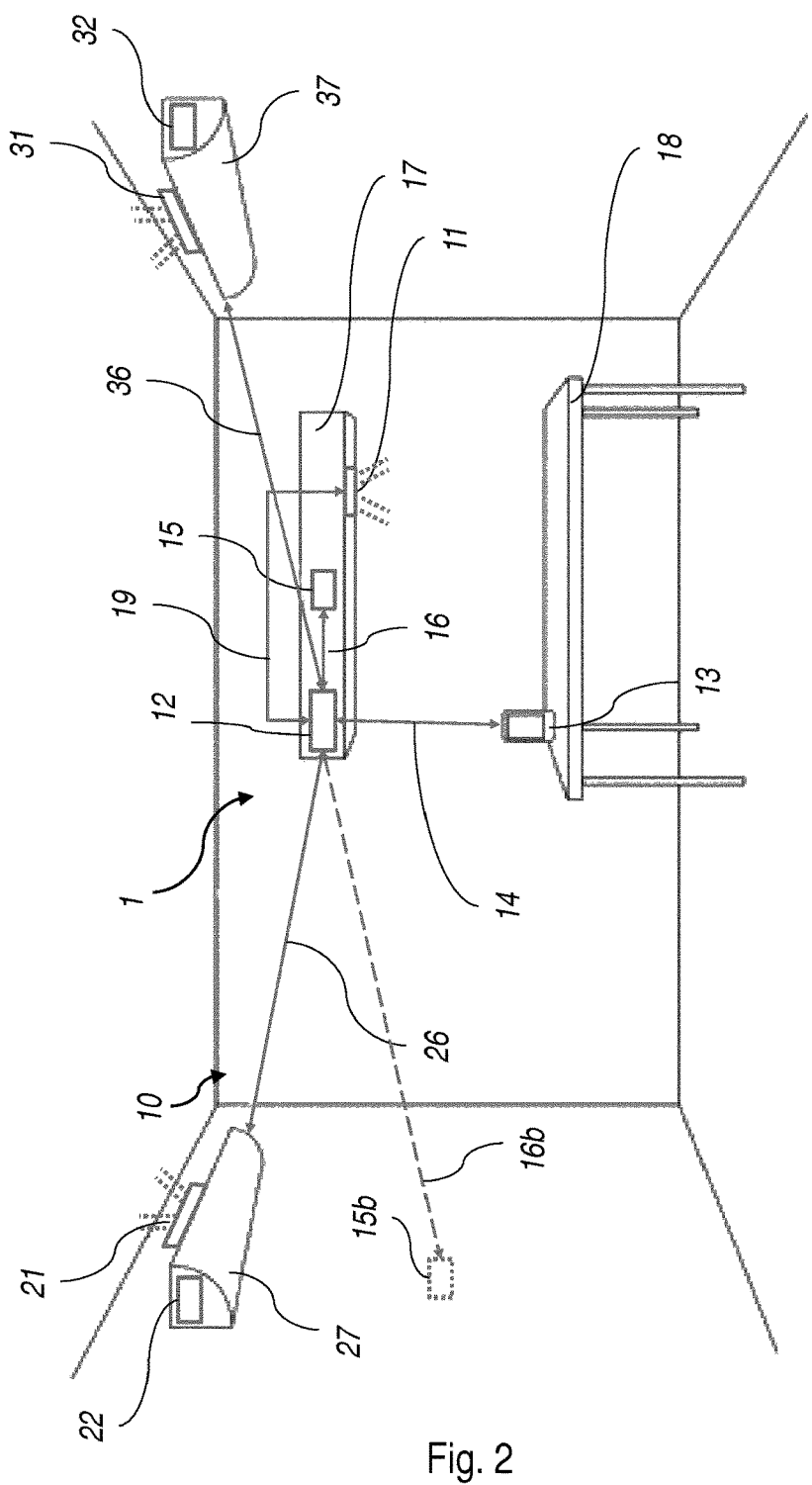
FIG. 2 is a perspective view of a room having a lighting system with three lighting fixtures.

FIG. 2 shows another embodiment of the lighting system 1, also being arranged in a room 10, but wherein the first lighting fixture 17 act as a master lighting fixture and wherein the system further comprises two slave lighting fixtures 27, 37. In another embodiment there may be only one slave lighting fixture and in yet other embodiments there may be many, such as five or even up to twenty or a hundred, slave lighting fixtures.

Each slave lighting fixture 27, 37 comprises illuminating means 21, 31 and a corresponding slave control unit 22, 32 configured to control the light emitted from each of the illuminating 21, 31 means of the two slave lighting fixtures 27, 37.

Moreover, each slave control unit 22, 32 are configured to receive wireless control communication 26, 36 from the first control unit 12 originating from a user's control commands sent from the mobile device 13. The control commands sent from the mobile device 13 to the control unit 12 may be either manually sent by the user or automatically generated based on profiles, a presetting, or conditions in the room such at time of the day, light in the room or events detected by the mobile device or other sensors.

Moreover, the slave lighting fixtures 27, 37 are illustrated as wall lighting fixtures, but may be any kind of lighting fixtures in other embodiments, such as pendant luminaires, spotlights, floor luminaires, desktop luminaires or any other type of luminaires or light fixtures.

Moreover, in the embodiment shown in FIG. 2, an alternative placement of the sensor 15b for detecting presence is schematically illustrated as being arranged at a distance from the master lighting fixture 17 and being communicatively connected 16b to the control unit. The connection 16b may be either wired or wireless, but when the sensor 15b is arranged at a distance from the master lighting fixture, a wireless communication is preferred.

The communication between the control units 12, 22, 32 is in the illustrated example Zigbee wireless communication. In other embodiments other wireless technologies may be used.

Figure 3:
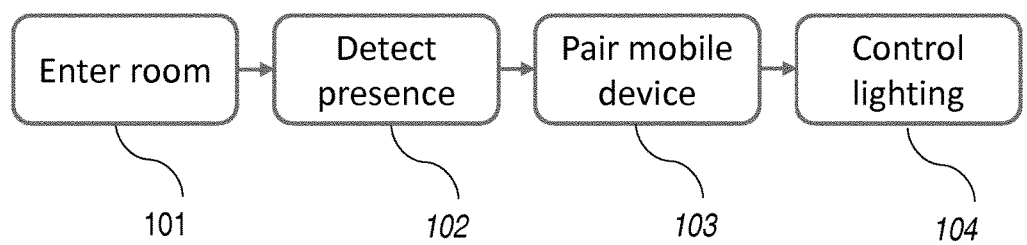
FIG. 3 is a schematic illustration of the steps performed when using a lighting system as described.

FIG. 3 shows an overview of how the above-mentioned lighting system may be used. In one example embodiment of the pairing of a new mobile device to the lighting system may be conducted as the following scenario. As a prerequisite the control unit in the master lighting fixture and the mobile device to be paired both supports a wireless communication such as Bluetooth. In a preferred embodiment they both support Bluetooth V2.1 Secure Simple Pairing Bluetooth. Moreover, the user has downloaded application software to the mobile device. When a user enters the room 101 the sensor 15 (e.g. a PIR sensor) detects presence 102 in the room. At presence detection the Bluetooth connection for pairing a mobile device is opened in the control unit 12 of the master lighting fixture for about 1 min, and continuously extended during presence. The predetermined time of 1 min may be altered as described above.

Thereafter, the user uses the application on the mobile device 13 for scanning for compatible control units 12 in the Bluetooth range. Thereafter e.g. the master lighting fixture having a control unit 12 with strongest signal, and/or correct room number, is to be selected in application by the user. Thereafter the selected master lighting fixture will flash to confirm the pairing of the mobile device to the control unit 103. If the lighting fixture does not confirm the pairing, a user can select the next master lighting fixture in the app list to find the correct one. Thereafter, it is possible to optionally create new User Profile including an optional PIN-code and user profile name such as John's profile. Thereafter the mobile device 13 is added to the created user profile. When the above mentioned pairing is completed the mobile device 13 may be used for controlling the lighting system 104.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A lighting system (1) for providing light in a room (10) comprising;
   first illuminating means (11);
   a first control unit (12) configured to control the light emitted from the first illuminating means (11) and further configured to receive wireless control communication (14) from a mobile device (13) after being paired with the mobile device;
   wherein the lighting system (1) further comprises
   a sensor (15) for detecting presence of a person in the room (10) and for being communicatively connected (16) to the control unit (12); and wherein
   the control unit (12) is configured to only allow pairing of the mobile device (13) to the control unit during a predetermined time following a detection of presence of the person in the room by the sensor (15), thereby obtaining increased security as compared to a like system that is not configured to only allow pairing of the mobile device to the control unit during a predetermined time following a detection of presence of the person in the room.

2. The lighting system (1) according to claim 1, wherein the sensor (15) is one of a temperature sensor or a photo sensor.

3. The lighting system (1) according to claim 1, wherein the sensor (15) is a passive infrared sensor.

4. The lighting system (1) according to claim 1, wherein the first illuminating means (11) and control unit (12) are integrated in a first lighting fixture.

5. The lighting system (1) according to claim 1, wherein the wireless control communication (14) between the mobile device (13) and the control unit (12) is Bluetooth communication.

6. The lighting system (1) according to claim 1, wherein the control unit (12) is configured to control the lighting color of the light emitted from the first illuminating means (11).

7. The lighting system (1) according to claim 1, wherein the control unit (12) is configured to control the color temperature of the light emitted from the first illuminating means (11).

8. The lighting system (1) according to claim 1, wherein the light in the room is controlled by means of the mobile device (13).

9. A lighting system (1) for providing light in a room (10) comprising;
first illuminating means (11);
a first control unit (12) configured to control the light emitted from the first illuminating means (11) and further configured to receive wireless control communication (14) from a mobile device (13) after being paired with the mobile device;
a sensor (15) for detecting presence of a person in the room (10) and for being communicatively connected (16) to the control unit (12); and wherein the control unit (12) is configured to only allow pairing of the mobile device (13) to the control unit during a predetermined time following a detection of presence of the person in the room by the sensor (15), thereby obtaining increased security as compared to a like system that is not configured to only allow pairing of the mobile device to the control unit during a predetermined time following a detection of presence of the person in the room;
wherein the first illuminating means (11) is arranged in a lighting fixture being a master lighting fixture (17) and the system further comprises at least one slave lighting fixture (27, 37) each comprising illuminating means (21, 31) and a corresponding slave control unit (22, 32) configured to control the light emitted from each of the illuminating means (21, 31) of the at least one slave lighting fixtures and each slave control unit (22, 32) being further configured to receive wireless control communication (26, 36) from the first control unit (12) originating from the mobile device (13).

10. The lighting system (1) according to claim 9, wherein the wireless control communication (26, 36) from the first control unit (12) to the control unit(s) (22, 32) of the at least one slave lighting fixture(s) (27, 37) is Zigbee communication.

11. The lighting system (1) according to claim 9, wherein the sensor (15) is one of a temperature sensor, a photo sensor or a passive infrared sensor.

12. The lighting system (1) according to claim 9, wherein the control unit (12) is configured to control the lighting color of the light emitted from first illuminating means (11).

13. The lighting system (1) according, to claim 9, wherein the control unit (12) is configured to control the color temperature of the light emitted from first illuminating means (11).

14. A lighting system (1) to provide light in a room the system comprising;
first illuminating means (11);
a first control unit (12) controlling the light emitted from the first illuminating means (11) based on received wireless control communication from a mobile device (13) after being paired with the mobile device;
wherein the lighting system (1) further comprises
a sensor (15) for detecting presence of a person in the room and being communicatively connected to the control unit (12); and wherein
the control unit (12) only allows pairing of the mobile device (13) to the control unit during a predetermined time following a detection of presence of the person in the room by the sensor (15), thereby obtaining increased security as compared to a like system that is not configured to only allow pairing of the mobile device to the control unit during a predetermined time following a detection of presence of the person in the room.

15. The lighting system (1) according to claim 14, wherein the sensor (15) is a passive infrared sensor.

16. The lighting system (1) according to claim 15, wherein the wireless control communication between the mobile device (13) and the control unit (12) is Bluetooth Communication.

17. The lighting system (1) according to claim 14, wherein the wireless control communication between the mobile device (13) and the control unit (12) is Bluetooth communication.

18. The lighting system (1) according to claim 17, wherein the first illuminating means (11) is arranged in a lighting fixture being a master lighting fixture and the system further comprises at least one slave lighting fixture each comprising illuminating means and a corresponding slave control unit (22, 32) controlling the light emitted from each of the illuminating means of the at least one slave lighting fixture, and each slave control unit (22, 23) further receives wireless control communication from the first control unit (12) controlled by the mobile device (13).

19. The lighting system (1) according to claim 14, wherein the first illuminating means (11) is arranged in a lighting fixture being a master lighting fixture and the system further comprises at least one slave lighting fixture each comprising illuminating means and a corresponding slave control unit (22, 32) controlling the light emitted from each of the illuminating means of the at least one slave lighting fixture, and each slave control unit (22, 23) further receives wireless control communication from the first control unit (12) controlled by the mobile device (13).

20. The lighting system (1) according to claim 19, wherein the wireless control communication (26, 36) from the first control unit (12) to the control units (22, 23) of the at least one slave lighting fixture(s) (27, 37) is Zigbee communication.

21. A configuration of a plurality of lighting systems comprising:
A plurality of lighting systems for providing light in respective areas arranged within the range of wireless communication signals of a user's mobile device;

Each of the lighting systems comprising
- first illuminating means;
  - a first control unit configured to control the light emitted from the first illuminating means and further configured to receive wireless control communication from the mobile device after being paired with the mobile device;
- wherein each of the systems further comprises
  - a sensor for detecting presence of a person in the respective area of each lighting system and for being communicatively connected to the first control unit; and wherein
- the control unit is configured to only allow pairing of the mobile device to the control unit during a predetermined time following a detection of presence of the person in the respective area by the sensor, thereby obtaining increased security as compared to a like system that is not configured to only allow pairing of the mobile device to the control unit during a predetermined time following a detection of presence of the person in the respective area;
- wherein the feature of only allowing pairing of the mobile device to the control unit following a detection of presence in the respective area limits the number of lighting systems available to the user to choose for pairing.

* * * * *